July 13, 1954   J. A. MAJESKI   2,683,310
HEDGE AND GRASS TRIMMER
Filed Oct. 8, 1951
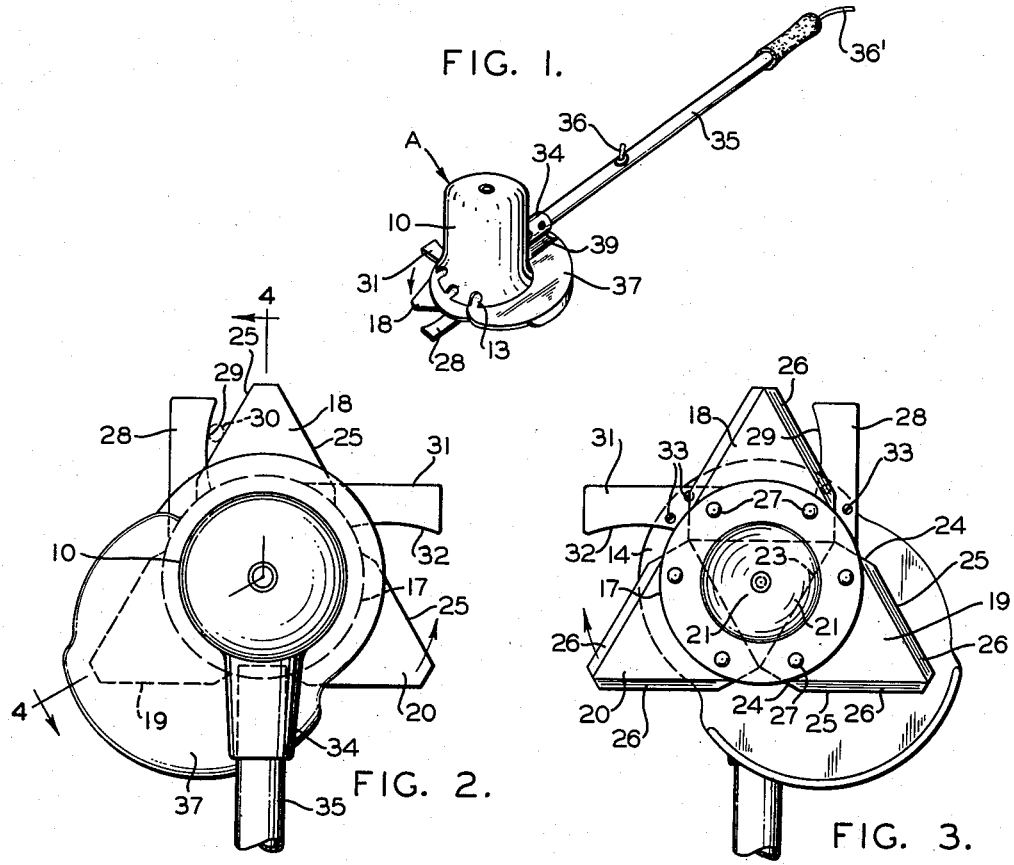
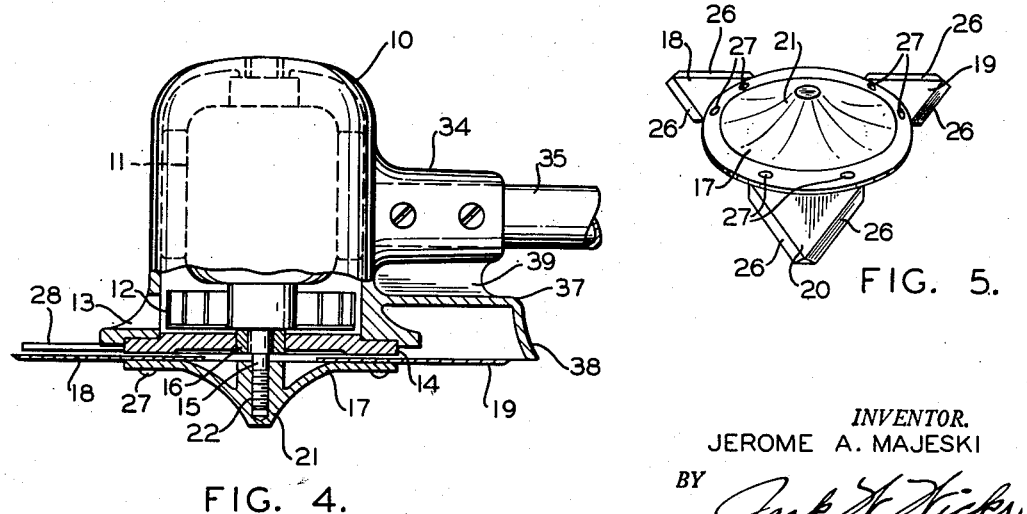
INVENTOR.
JEROME A. MAJESKI
BY
ATTORNEY Patented July 13, 1954

2,683,310

UNITED STATES PATENT OFFICE 2,683,310

HEDGE AND GRASS TRIMMER

Jerome A. Majeski, St. Paul, Minn., assignor of one-half to Bernard L. Roether, St. Paul, Minn.

Application October 8, 1951, Serial No. 250,265

2 Claims. (Cl. 30—206)

My invention relates to an improvement in an implement used in connection with the care of shrubbery and gardening and particularly adaptable to the trimming of hedges and grass, the principal object of which resides in providing a trimmer which reduces to a minimum the labor in trimming hedges and the like and also increasing the efficiency of such implements.

It is an object of my invention to provide a trimmer driven by an electric motor which drives a series of blades or shears of such a construction that it will cut at virtually any angle in which the trimmer is placed, thereby increasing ease of cutting and reducing movement of the operator.

It is an additional object of my invention to provide a trimmer having a series of triangular shaped blades moving in a rotary motion which will cut a swath of 360° and cut when the machine is moved to the right, left, forwardly, backwardly, upwardly, or downwardly without changing the position of the operator.

It is a further object to provide one or more stationary blades or bars formed with an arcuated leading edge, which edge tends to have the twig or the like cut at the center or bottom of the arcuated edge when the rotating blade passes adjacent the same.

It is also an object of my invention to form a cone-like surface on the underside of a disc member which supports the cutting blades. The cone-like surface tends to direct twigs and the like outwardly toward the cutting blades as the trimmer is mover over or down upon shrubbery which is to be trimmed. In order that the invention may be readily understood and the advantages rendered more apparent, reference is made to the accompanying drawing wherein I have illustrated one embodiment of driven revolving blades embodying my invention. However, it is to be understood that the invention may be embodied in other forms other than that shown and described and that changes in the details of construction may be made within the scope of the claims without departing from said invention.

In the drawings forming part of the application:

Figure 1 is a perspective view of my hedge and grass trimmer.

Figure 2 is a top plan view of my trimmer showing only a portion of the handle.

Figure 3 is a bottom view of my trimmer showing only a portion of the handle.

Figure 4 is a partial sectional view on the line 4—4 of Figure 2.

Figure 5 is a perspective view of the cutting blades secured to the mounting therefor.

My hedge and grass trimmer A is composed of a housing 10 in which is mounted an electric motor 11. Mounted on the motor 11 is a fan 12 adapted to cool the motor through the use of the openings 13 formed in the housing 10. Secured to the lower flared open portion of the housing 10 is the circular plate member 14 which also mounts the end of the shaft 15 of the motor 11 through the use of a suitable bearing such as 16.

I also provide a cone disc member 17 on the edge of which is mounted the identical cutting blades 18, 19 and 20. The cone disc 17 is drilled and tapped centrally in the raised portion 21 so that the same may be screwed on to the threaded end 22 of the shaft 15. The blade, such as 19, is formed with the straight base edge 23, the right angular side portions 24, and the angular edges 25. The edges 25 have formed therein the bevelled cutting surfaces 26. Adjacent the base edge 23 are formed holes adapted to receive the screws or rivets 27 which secure the blades 18, 19 and 20 to the outer periphery of the cone disc 17.

The stationary blade bar 28 has formed on one side thereof the arcuated edge portion 29 which tends to keep a twig such as 30 in the bottom of the arcuated portion 29 as the cutting edge 26 is brought against the twig 30 particularly as shown in Figure 2 in which position the twig 30 is cut off. With the arcuated edge 29, the twig 30 does not tend to move inwardly toward the center of the housing due to the remaining arcuated portion the twig has to climb as it were when the shearing action occurs as the blade 18 e. g. comes to the blade bar 28. The blade bar 31 is identical with the bar 28 and has the arcuated edge 32. The blade bars 28 and 31 are secured to the underside of the circular plate member 14 by means of the screws 33. With the bars 28 and 31 in place, the cone disc 17 is secured to the shaft 15.

Protruding from the housing 10 is the handle receiving portion 34 which receives the end of the hollow handle 35, the handle 35, mounting the switch 36, which turns the motor 11 off and on by suitable wiring not shown in the drawings. A suitable wire 36' extends through the handle to the switch 36 from a source of power.

I also provide a guard plate 37, positioned above the cutting blades which extend from the housing 10 and has the depending flange portion 38 which is closely adjacent to the outer ends of the cutting blades 18, 19, and 20 as they rotate beneath the plate 37. The plate 37 is strengthened by means of the rib 39 which joins the portion 34 to the guard plate 37. The operator normally stands on the side of the handle 35 where the guard plate 37 extends to the greatest degree.

With my somewhat triangular shaped blades, such as 18, having an angular cutting edge 25, twigs and the like are easily and efficiently cut off as the trimmer is moved over the shrubbery and heavier twigs easily cut off due to the positioning against the arcuated edges 29 and 32 of the bars 28 and 31 respectively for the reason hereinbefore stated. Because the leading cutting edges 25 are free to cut in their total path and because the guard 37 is above the same and the flange 38 close to the blades as they rotate, by trimmer A will cut as the same is moved downwardly upon a hedge and a 360° circle will be cut. The trimmer may also be moved to the right or left, forward or backward, or tipped slightly to get into small places. In addition, due to my construction, the outer edges of the blades may be used to cut the vertical edge of a hedge when moving the housing up and down in a vertical position. The trimmer may also be held with the housing in a horizontal position in going up and down the vertical side of the hedge to trim the same. It is apparent that my trimmer may also be powered with a gasoline engine.

The angular edges 25 with the cutting edges 26 cut twigs and the like with a shearing action which shearing action is particularly noticeable and effective where the blade such as 18, is directed adjacent to the bars 28. However, the shearing action of my blades occurs without the aid of the bars 28 as the blades cut the twigs and the like.

The invention is not to be understood as restricted to the details set forth since these may be modified within the scope of the appended claims without departing from the spirit and scope of the invention.

Having thus described the invention, what I claim as new and desire to secure by Letters Patent is:

1. In a hedge and grass trimmer, a housing, an electric motor mounted in said housing and having a shaft extending therefrom, a plate member secured to said shaft, one or more horizontally disposed blade bars secured to said housing, an arcuated edge formed on one side of said blade bars, at least one triangular shaped cutting blade secured to said plate member, guard means secured to a rear portion of said housing above and adjacent said blade, said guard means including a flat plate member extending approximately a 90° segment of the area covered by said blade and formed with a depending flange portion, and switch means for operating said motor.

2. In a hedge trimmer, a housing, an electric motor housing and shaft and mounted within said housing, a plate member secured to said housing and through which said shaft extends, a series of horizontally disposed blade bars secured to said plate member, an arcuated edge formed on one side of said blade bars, a cone disc member secured to the end of said shaft, a series of triangular shaped blades secured to said cone disc member, a guard member mounted above and adjacent said blades, said guard member comprising a flat plate member extending approximately a 90° segment of the area covered by said blades and formed with a depending flange portion and switch means for operating said motor.

References Cited in the file of this patent
UNITED STATES PATENTS

| Number | Name | Date |
|---|---|---|
| D. 144,433 | Virze | Apr. 19, 1946 |
| 2,212,057 | Waller | Aug. 20, 1940 |
| 2,245,821 | Poynter | June 17, 1941 |
| 2,476,394 | Webb et al. | July 19, 1949 |